(12) United States Patent
Yang

(10) Patent No.: US 10,769,710 B2
(45) Date of Patent: Sep. 8, 2020

(54) SYSTEM OF PROVIDING PRODUCT INFORMATION USING COPY/PASTE FUNCTION OF ELECTRONIC COMMERCE SHOPPING CART, METHOD THEREOF AND NON-TRANSITORY COMPUTER READABLE STORAGE MEDIUM HAVING COMPUTER PROGRAM RECORDED THEREON

(71) Applicant: Eleven Street Co., Ltd, Seoul (KR)

(72) Inventor: Jungil Yang, Seongnam-si (KR)

(73) Assignee: Eleven Street Co., Ltd., Seoul (KR)

( * ) Notice: Subject to any disclaimer, the term of this patent is extended or adjusted under 35 U.S.C. 154(b) by 300 days.

(21) Appl. No.: 15/934,775

(22) Filed: Mar. 23, 2018

(65) Prior Publication Data
US 2018/0276738 A1 Sep. 27, 2018

(30) Foreign Application Priority Data
Mar. 23, 2017 (KR) .................. 10-2017-0037122

(51) Int. Cl.
G06Q 30/06 (2012.01)
G06Q 30/02 (2012.01)
G06F 3/048 (2013.01)
G06F 16/955 (2019.01)
G06F 3/0484 (2013.01)
G06F 3/0482 (2013.01)
(Continued)

(52) U.S. Cl.
CPC ....... *G06Q 30/0633* (2013.01); *G06F 3/0482* (2013.01); *G06F 3/04842* (2013.01); *G06F 16/955* (2019.01); *G06F 16/9566* (2019.01); *G06Q 30/0601* (2013.01); *G06Q 30/0641* (2013.01); *G06Q 50/01* (2013.01); *G06Q 30/0251* (2013.01); *G06Q 30/0253* (2013.01); *H04L 51/32* (2013.01)

(58) Field of Classification Search
None
See application file for complete search history.

(56) References Cited

U.S. PATENT DOCUMENTS 6,850,917 B1 * 2/2005 Hom .................... G06Q 20/206
705/18
7,970,661 B1 * 6/2011 Abraham ............... G06Q 10/10
705/14.23
(Continued)

FOREIGN PATENT DOCUMENTS

EP 2648153 A1 * 10/2013 ......... G06Q 30/0641

OTHER PUBLICATIONS

Du, L., et al., "Design of Intelligent Marketing System based on E-Commerce Trading," 2014 Sixth International Conference on Measuring Technology and Mechatronics Automation, pp. 243-246, Jan. 1, 2014. (Year: 2014).*

*Primary Examiner* — Nicholas D Rosen
(74) *Attorney, Agent, or Firm* — Fenwick & West LLP

(57) ABSTRACT

Disclosed are a system of providing product information using a copy/paste function of an electronic commerce shopping cart, a method thereof and a non-transitory computer readable storage medium having a computer program recorded thereon. The method can be used as an effective intercommunication means by mutual exchange of shopping lists with acquaintances or friends rather than solo shopping. Further, user convenience in purchasing products and the probability of purchasing products can be enhanced by the method.

6 Claims, 8 Drawing Sheets

(51) Int. Cl.
*G06Q 50/00* (2012.01)
*G06F 9/54* (2006.01)
*H04L 12/58* (2006.01)

(56) References Cited

U.S. PATENT DOCUMENTS

| | | | |
|---|---|---|---|
| 10,127,590 B2* | 11/2018 | Bawge | G06Q 30/0613 |
| 10,127,599 B2* | 11/2018 | Maenpaa | G06Q 30/0601 |
| 10,127,600 B2* | 11/2018 | Kumar | G06Q 30/0633 |
| 2008/0189190 A1* | 8/2008 | Ferber | G06Q 30/06 705/26.41 |
| 2012/0197700 A1* | 8/2012 | Kalin | G06Q 30/0222 705/14.23 |
| 2013/0268850 A1* | 10/2013 | Kyprianou | G06F 40/166 715/255 |
| 2014/0025531 A1* | 1/2014 | Nachiappan | G06Q 30/0631 705/26.7 |
| 2014/0081801 A1* | 3/2014 | Lee | G06F 16/23 705/26.8 |
| 2014/0195370 A1* | 7/2014 | Devasia | G06Q 30/0633 705/26.7 |
| 2014/0244441 A1* | 8/2014 | Maenpaa | G06Q 30/0601 705/26.62 |
| 2016/0035005 A1* | 2/2016 | Kumar | G06Q 30/0633 705/26.8 |
| 2016/0171578 A1* | 6/2016 | Bawge | G06Q 30/0613 705/26.41 |
| 2017/0132627 A1* | 5/2017 | Phillips | G06Q 20/401 |
| 2018/0137557 A1* | 5/2018 | Vadher | G06Q 30/0633 |

* cited by examiner

SYSTEM OF PROVIDING PRODUCT INFORMATION USING COPY/PASTE FUNCTION OF ELECTRONIC COMMERCE SHOPPING CART, METHOD THEREOF AND NON-TRANSITORY COMPUTER READABLE STORAGE MEDIUM HAVING COMPUTER PROGRAM RECORDED THEREON

CROSS-REFERENCE TO RELATED APPLICATIONS

This application is based on and claims the benefit of priority to Korean Patent Application No. 10-2017-0037122 filed on Mar. 23, 2017, with the Korean Intellectual Property Office, the disclosure of which is incorporated herein by reference.

BACKGROUND OF THE INVENTION

Field of the Invention

The present invention relates to a system of providing product information using a copy/paste function of an electronic commerce shopping cart, a method thereof and a non-transitory computer readable storage medium having a computer program recorded thereon, and more particularly, to a system of providing product information using a copy/paste function of an electronic commerce shopping cart, a method thereof and a non-transitory computer readable storage medium having a computer program recorded thereon, which generates a web page capable of checking information on at least one product information when a sharing function for at least one product information stored in the shopping cart is selected by a user of a terminal in a shopping mall site provided from a server, provides a URL address associated with the generated web page to one or more other terminals associated with the terminal in a text message form, a messenger service form, a social network service form, and the like, checks at least one product information to be shared by the user of the terminal by accessing a web page corresponding to the URL address including at least one product information by means of one or more other terminals, and performs a copy/paste function of at least one checked product information to the user's shopping cart.

DESCRIPTION OF THE RELATED ART

Due to the development of the Internet, the number of users who purchase products via online using online shopping mall sites is rapidly increasing, and the market for such online shopping mall businesses is rapidly increasing.

Before a customer purchases the products in the online shopping mall sites, a shopping cart function storing the products is provided, but the corresponding shopping cart function is a function that the customer just firstly stores the products before purchasing while searching for the products. Thus, since the shopping cart is stored in one place, there is an inconvenience in managing the shopping cart to transfer product information stored in the shopping cart to friends or acquaintances or variously collect candidates before purchasing.

SUMMARY OF THE INVENTION

The present invention has been made in an effort to provide a system of providing product information using a copy/paste function of an electronic commerce shopping cart, a method thereof and a non-transitory computer readable storage medium having a computer program recorded thereon, which generates a web page capable of checking information on at least one product information when a sharing function for at least one product information stored in the shopping cart is selected by a user of a terminal in a shopping mall site provided from a server, provides a URL address associated with the generated web page to one or more other terminals associated with the terminal in a text message form, a messenger service form, a social network service form, and the like, checks at least one product information to be shared by the user of the terminal by accessing a web page corresponding to the URL address including at least one product information by means of one or more other terminals, and performs a copy/paste function of at least one checked product information to the user's shopping cart.

Further, the present invention has been made in an effort to provide a system of providing product information using a copy/paste function of an electronic commerce shopping cart, a method thereof and a non-transitory computer readable storage medium having a computer program recorded thereon, which groups a plurality of products included in a shopping cart for each purpose according to a purpose and provides a naming function for the groups.

An embodiment of the present invention provides a method of providing product information using a copy/paste function of an electronic commerce shopping cart, the method comprising: transmitting, by the terminal, one or more pieces of sharing information, sharing request information, and identification information of a terminal to a server, in order to share at least one product information stored in a shopping cart associated with the terminal; generating, by the server, a web page including the at least one product information stored in the shopping cart associated with the terminal; transmitting, by the server, address information about the generated web page to one or more other terminals corresponding to the one or more pieces of sharing information, respectively; displaying, by the one or more other terminals, the address information about the web page transmitted from the server, respectively; displaying, by a specific other terminal among the one or more other terminals, at least one product information included in the web page provided by the server by interlocking with the server when the address information about the web page is selected; and storing automatically, by the specific other terminal, the at least one product information included in the web page in a shopping cart associated with the specific other terminal by interlocking with the server when a predetermined copy/paste menu displayed on one side of the web page is selected.

As one example associated with the present invention, the sharing information may include one or more of a telephone number, an email address, and social network account information for sharing the at least one product information stored in the shopping cart associated with the terminal.

As one example associated with the present invention, in the transmitting of the address information about the generated web page to one or more other terminals corresponding to the one or more pieces of sharing information, when a group name for the shopping cart including the at least one product information to be shared by interlocking with the terminal and the server is set, the server may transmit the address information about the web page and the group name corresponding to the shopping cart together to the one or more other terminals corresponding to the one or more pieces of sharing information so as to provide a use of the shopping cart associated with the generated web page.

As one example associated with the present invention, the method may further include grouping, by the terminal, the at least one product information included in a current shopping cart by interlocking with the server when a grouping menu displayed on one side of a screen of the shopping cart associated with the terminal is selected; performing, by the terminal, a group name setting function for a group including the at least one grouped product information according to a user input; and storing, by the server, information about the group including the at least one grouped product information.

As one example associated with the present invention, in the storing of the information about the group including the at least one grouped product information, when the terminal is logged into a dedicated app or a shopping mall site provided from the server, the information about the group maybe stored in an account associated with the user of the terminal by interlocking.

As one example associated with the present invention, in the automatically storing of the at least one product information included in the web page in the shopping cart associated with the specific other terminal, when a group name for the shopping cart including the at least one product information to be shared by interlocking with the terminal and the server is set, the shopping cart set with the group name may be copied and pasted to the shopping cart associated with the specific other terminal as it is.

Another embodiment of the present invention provides a non-transitory computer-readable storage medium which may store a computer program comprising a set of instructions, when executed, arranged to cause a terminal to implement the method of providing the product information using the copy/paste function of the electronic commerce shopping cart.

Yet another embodiment of the present invention provides a system of providing product information using a copy/paste function of an electronic commerce shopping cart, the system comprising: a terminal configured to transmit one or more pieces of sharing information, sharing request information, and identification information of the terminal in order to share at least one product information stored in a shopping cart associated with the terminal; a server configured to generate a web page including the at least one product information stored in the shopping cart associated with the terminal, and transmit address information about the generated web page to one or more other terminals corresponding to the one or more pieces of sharing information, respectively; and the one or more other terminals configured to display the address information about the web page transmitted from the server, respectively.

As one example associated with the present invention, a specific other terminal among the one or more other terminals may display at least one product information included in the web page provided by the server by interlocking with the server when the address information about the web page is selected, and store automatically the at least one product information included in the web page in a shopping cart associated with the specific other terminal by interlocking with the server when a predetermined copy/paste menu displayed on one side of the web page is selected.

As one example associated with the present invention, when a group name for the shopping cart including the at least one product information to be shared by interlocking with the terminal and the server is set, the server may transmit the address information about the web page and the group name corresponding to the shopping cart together to the one or more other terminals corresponding to the one or more pieces of sharing information so as to provide a use of the shopping cart associated with the generated web page.

As one example associated with the present invention, when a group name for the shopping cart including the at least one product information to be shared by interlocking with the terminal and the server is set, the specific other terminal may store the shopping cart set with the group name in the shopping cart associated with the specific other terminal as it is.

According to the present invention, it is possible to be utilized as an effective intercommunication means by mutual exchange of shopping lists with acquaintances or friends rather than solo shopping, increase the convenience in use, and enhance the probability of purchasing products, by generating a web page capable of checking information on at least one product information when a sharing function for at least one product information stored in the shopping cart is selected by a user of a terminal in a shopping mall site provided from a server, providing a URL address associated with the generated web page to one or more other terminals associated with the terminal in a text message form, a messenger service form, a social network service form, and the like, checking at least one product information to be shared by the user of the terminal by accessing a web page corresponding to the URL address including at least one product information by means of one or more other terminals, and performing a copy/paste function of at least one checked product information to the user's shopping cart.

Further, according to the present invention, it is possible to variously and conveniently manage products before purchasing, by grouping a plurality of products in the shopping cart for each purpose according to a purpose and providing a naming function for each group.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
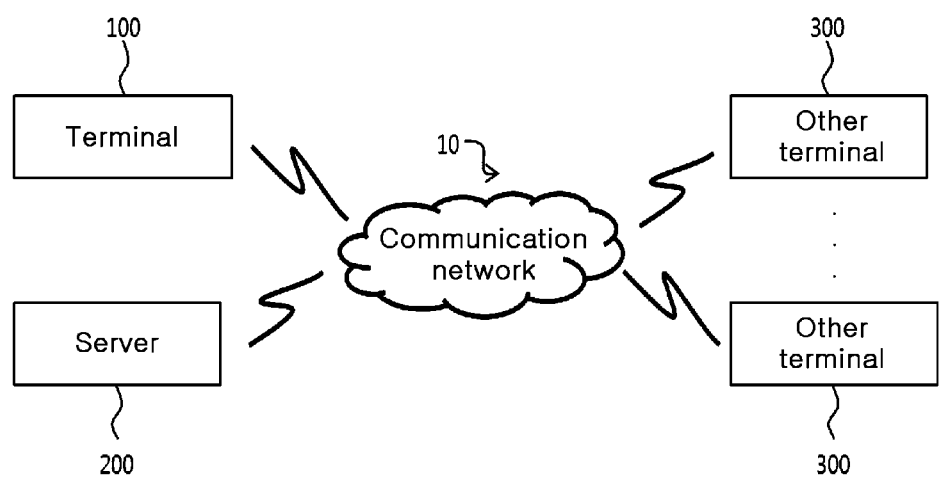
FIG. 1 is a block diagram illustrating a configuration of a system of providing product information using a copy/paste function of an electronic commerce shopping cart according to an embodiment of the present invention.

Technical terms used in the present invention are used only to describe specific embodiments, and are not intended to limit the present invention. Further, unless otherwise defined, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art.

In addition, a general term used in the present invention should be interpreted as defined in a dictionary or contextually, and should not be interpreted as an excessively reduced meaning.

Further, singular expressions used in the present invention include plural expressions unless they have definitely opposite meanings in the context. In the present invention, a term such as "comprising" or "including" should not be interpreted as necessarily including all various components or various steps disclosed in the invention, and it should be interpreted that some component or some steps among them may not be included or additional components or steps may be further included.

Further, terms including an ordinary number, such as first and second, and the like are used for describing various components, but the components are not limited by the terms. The above terms are used only to discriminate one component from the other components. For example, a first component may be referred to as a second component, and similarly, the second component may be referred to as the first component without departing from the scope of the present invention.

Hereinafter, embodiments of the present invention will be described in detail with reference to the accompanying drawings, in which like reference numerals refer to like or similar elements regardless of reference numerals and a duplicated description thereof will be omitted.

Further, in the following description, a detailed explanation of known associated technologies may be omitted to avoid unnecessarily obscuring the subject matter of the present disclosure. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a system 10 of providing product information using a copy/paste function of an electronic commerce shopping cart according to an embodiment of the present invention.

As illustrated in FIG. 1, the system 10 of providing product information using a copy/paste function of an electronic commerce shopping cart comprises a terminal 100, a server 200, and one or more other terminals 300. All the components of the system 10 of providing the product information illustrated in FIG. 1 are not required components, and the system 10 of providing the product information may also be implemented by more components than the components illustrated in FIG. 1 or the system 10 of providing the product information may also be implemented by less components therethan.

The terminal 100 temporality stores at least one product information in a shopping cart associated with the terminal 100 according to a user's selection from one or more pieces of product information provided from the server 200. In addition, when a grouping menu displayed at one side of a shopping cart screen of the terminal 100 is selected, the terminal 100 groups at least one product information temporarily stored in the corresponding shopping cart by interlocking with the server 200 and performs a naming function for the grouped shopping cart. In addition, when a sharing menu displayed at the other side of the shopping cart screen of the terminal 100 is selected, the terminal 100 selects one or more other terminals 300 for sharing at least one product information stored in the shopping cart and transmits selected sharing information, sharing request information, and the like to the server 200. Thereafter, the server 200 generates a web page including at least one product information included in a shopping cart item (or a shopping cart) associated with the terminal 100 based on the sharing request information, and transmits address information on the generated web page to the one or more other terminals 300 corresponding to the sharing information, respectively. Thereafter, the one or more other terminals 300 access the web page to check at least one product information shared by the terminal 100 and stores at least one product information in the shopping cart item (alternatively, the shopping cart) associated with other terminals 300 by interlocking with the server 200.

The terminal 100 and other terminals 300 may be applied to various terminals, such as a smart phone, a portable terminal, a mobile terminal, a personal digital assistant (PDA), a portable multimedia player (PMP), a telematics terminal, a navigation terminal, a personal computer, a notebook computer, a slate PC, a tablet PC, an ultrabook, a wearable device (for example, including a smart watch, a smart glass, a head mounted display (HMD), etc.), a Wibro terminal, an Internet protocol television (IPTV) terminal, a smart TV, a digital broadcasting terminal, a television, a 3D television, a home theater system, an audio video navigation (AVN) terminal, an audio/video (A/V) system, a flexible terminal, and the like.

The first terminal 100, the server 200, and the second terminal 300 may be constituted by a communication unit (not illustrated), a storage unit (not illustrated), a display unit (not illustrated), a voice output unit (not illustrated), and a control unit (not illustrated), respectively.

Herein, the communication unit communicates with any internal component or at least any one external terminal via a wired/wireless communication network. In this case, any external terminal may include the terminal 100, the server 200, one or more other terminals 300, and the like. Herein, the wireless Internet technology may include wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS), and the like. The communication unit transmits and receives data according to at least one wireless Internet technology in a range including Internet technologies which are not listed above. Further, as the short range communication technology, Bluetooth, radio frequency identification (RFID), Infrared data association (IrDA), ultra wideband (UWB), ZigBee, near field communication (NFC), ultra sound communication (USC), visible light communication (VLC), Wi-Fi, Wi-Fi Direct, and the like may be included. In addition, as the wired communication technology, power line communication (PLC), USB communication, Ethernet, serial communication, optical/coaxial cables, and the like may be included.

Further, the communication unit may mutually transmit information with any terminal through a universal serial bus (USB).

Further, the communication unit transmits and receives wireless signals with a base station, the terminal 100, the server 200, one or more other terminals 300, and the like on a mobile communication network constructed according to technology standards or communication schemes (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.) for mobile communication.

The storage unit stores various user interfaces (UIs) and graphic user interfaces (GUIs).

Further, the storage unit stores data, programs, and the like which are required to operate the terminal 100, the server 200, one or more other terminals 300, and the like.

That is, the storage unit may store a plurality of application programs (alternatively, applications) driven in the terminal 100, the server 200, one or more other terminals 300, and the like, and data and commands for operating the terminal 100, the server 200, one or more other terminals 300, and the like. At least some of the application programs may be downloaded from an external service providing apparatus through wireless communication. Further, at least some of the application programs may be present on the terminal 100, other terminals 300, and the like from a release time for basic functions (for example, call receiving and sending functions and message receiving and sending functions) of the terminal 100 and other terminals 300. Meanwhile, the application programs are stored in the storage unit and installed in the terminal 100, the server 200, one or more other terminals 300, and the like, and may be driven to perform operations (alternatively, functions) of the terminal 100, the server 200, one or more other terminals 300, and the like by the control unit.

Further, the storage unit may include at least one storage medium of a flash memory type, a hard disk type, a multimedia card micro type, a card type memory (for example, an SD or XD memory, or the like), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the terminal 100, the server 200, one or more other terminals 300, and the like may operate a web storage which performs a storage function of the storage unit on the Internet or also operate in association with the web storage.

Further, the storage units included in the terminal 100 and one or more other terminals 300 store (alternatively, install) dedicated apps (for example, shopping apps) by a control of the control unit.

The display unit may display various contents such as various menu screens and the like using a user interface and/or a graphic user interface stored in the storage unit by the control of the control unit. Herein, the contents displayed on the display unit include various text or image data (including various information data), a menu screen including data such as icons, a list menu, and a combo box, and the like. Further, the display unit may be a touch screen.

Further, the display unit may include at least one of a liquid crystal display (LCD), a thin film transistor-liquid crystal display (TFT LCD), an organic light-emitting diode (OLED), a flexible display, a 3D display, an e-ink display, and a light emitting diode (LED).

Further, the display unit may be configured as a stereoscopic display unit displaying a stereoscopic image.

3D display types such as a stereoscopic type (a glasses type), an auto-stereoscopic type (a glassless type), and a projection type (a holographic type) may be applied to the stereoscopic display unit.

Further, the display unit display various information received by the communication unit by the control of the control unit.

The voice output unit outputs voice information included in a predetermined signal processed by the control unit. Herein, the voice output unit may include a receiver, a speaker, a buzzer, and the like.

Further, the voice output unit outputs a guidance voice generated by the control unit.

Further, the voice output unit outputs voice information corresponding to various information received by the communication unit by the control of the control unit.

The control unit executes overall control functions of the terminal 100, the server 200, and one or more other terminals 300.

In addition, the control unit executes overall control functions of the terminal 100, the server 200, and one or more other terminals 300 using programs and data stored in the storage unit. The control unit may include a RAM, a ROM, a CPU, a GPU, and a bus, and the RAM, the ROM, the CPU, the GPU, and the like may be connected to each other through the bus. The CPU accesses the storage unit to perform booting by using an O/S stored in the storage unit and perform various operations by using various programs, contents, data, and the like stored in the storage unit.

In addition, the control units included in the terminal 100 and one or more other terminals 300 may install (alternatively, register) specific apps (for example, shopping mall apps) in the terminal 100 and one or more other terminals 300 by interlocking with the server 200, respectively.

As such, each of the terminal 100, the server 200, and one or more other terminals 300 may include a communication unit, a storage unit, a display unit, a voice output unit, a control unit, and the like to perform unique functions of each apparatus.

The terminal 100 communicates with the server 200, other terminals 300, and the like.

Further, the terminal 100 executes a dedicated app (alternatively, an application) installed in the terminal 100 according to a user selection (alternatively, a user touch/input) to display an app execution result screen. Herein, the app execution result screen may be a screen corresponding to a web site (for example, a shopping mall site) provided from the server 200 associated with the corresponding dedicated app.

In addition, the terminal 100 receives a search word associated with a product to be purchased (alternatively, searched/inquired) by a user (alternatively, a purchaser) of the terminal 100 according to a user input.

Further, the terminal 100 transmits the received search word, identification information of the terminal 100, and the like to the server 200. Herein, the identification information of the terminal 100 includes a mobile directory number (MDN), a mobile IP, a mobile MAC, subscriber identity module (Sim) card unique information, a serial number, and the like.

Further, the terminal 100 receives a search result transmitted from the server 200 in response to the received search word, the identification information of the terminal 100, and the like. Herein, the search result includes one or more pieces of product information associated with the product corresponding to the search word. In addition, the product information includes category information of the product, a product name, a product unique code, a product related image, price information, delivery fee information (for example, including free delivery condition information, etc.), seller information, and the like. In addition, the seller information includes a seller name (e.g., a name of the seller, a nickname, an ID, a company name, etc.), location information of the seller, contact information of the seller, a registration number of an online marketing business, and the like.

Further, the terminal 100 displays the received search result.

In addition, when there is no product corresponding to a search word among a plurality of products registered in the server 200, the terminal 100 receives information indicating that there is no product corresponding to the search word transmitted from the server 200 in response to the search word, the identification information of the terminal 100, and the like, which are transmitted above.

Further, the terminal 100 displays information indicating that there is no product corresponding to the received search word, and the like.

In addition, the terminal 100 temporarily stores (alternatively, adds) at least one product information (alternatively, at least one product corresponding to at least one product information) selected from one or more pieces of product information provided from the server 200 in the shopping cart item (alternatively, the shopping cart) provided from the corresponding dedicated app (alternatively, the corresponding shopping mall site) in response to the search word associated with the product to be purchased (alternatively, searched/inquired) by the user (alternatively, the purchaser) of the terminal 100 according to one or more pieces of product information provided from the app execution result screen and/or the user input. In this case, the terminal 100 may be logged in or not logged in to the dedicated app (alternatively, the corresponding shopping mall site).

In addition, when a shopping cart menu displayed on one side of the current screen of the terminal 100 is selected after a process of inquiring the product and storing the product in the shopping cart item according to the user selection ends, the terminal 100 displays a shopping cart screen (alternatively, a shopping cart screen corresponding to the shopping cart menu) including at least one product information selected above.

In addition, when a grouping menu (alternatively, a grouping item/button) displayed on one side of a shopping cart screen of the terminal 100 is selected, the terminal 100 groups at least one product information included in the current shopping cart by interlocking with the server 200 and performs a naming function (alternatively, a group name setting function) for a group (alternatively, a shopping cart group) including at least one product information grouped according to the user input.

In addition, the server 200 stores information on a group including at least one grouped product information (for example, a group name, at least one product information included in the corresponding group, and the like).

At this time, when the terminal 100 is logged in to the dedicated app (alternatively, the shopping mall site), the server 200 stores (alternatively, manages) information on the corresponding group in an account associated with the user of the corresponding terminal 100 by interlocking.

Further, when the terminal 100 is not logged in to the dedicated app (alternatively, the shopping mall site), the server 200 temporarily stores the information on the corresponding group until the terminal 100 ends the access to the corresponding app (alternatively, the shopping mall site), or temporarily stores the identification information of the corresponding terminal 100 and the information on the corresponding group for a predetermined period (for example, 7 days).

Further, when a sharing menu (alternatively, a sharing item/button) displayed on the other side of the shopping cart screen of the terminal 100 is selected, the terminal 100 displays a sharer selection screen for selecting one or more other terminals 300 to share at least one product information temporarily stored in the current shopping cart item. Here, the sharer selection screen includes one or more telephone numbers stored in the terminal 100, one or more email addresses stored in the terminal 100, one or more pieces of other user information registered as friends (alternatively, followers in Facebook and the like) in a social network account associated with the terminal 100, items for receiving telephone numbers and/or email addresses according to a user input, and the like.

Further, the terminal 100 transmit to server 200 one or more pieces of sharing information (for example, including a telephone number, an email address, social network account information, etc.) selected according to a user selection (alternatively, a user input) from the sharer selection screen displayed in the terminal 100, sharing request information about at least one product included (alternatively, stored) in the shopping cart item associated with the corresponding terminal 100, identification information of the terminal 100, and the like. Herein, the identification information of the terminal 100 includes a MDN, a mobile IP, a mobile MAC, subscriber identity module (Sim) card unique information, a serial number, and the like.

Further, when the payment function for at least one product information included in the shopping cart of the terminal 100 is selected, the terminal 100 performs a payment function for at least one product associated with at least one selected product information by interlocking with the server 200 and a payment server (not illustrated). In this case, the terminal 100 may also perform a payment function for at least one product finally determined by interlocking with one or more other terminals 300 sharing the product information.

In addition, the terminal 100 receives a payment function execution result provided from the payment server (alternatively, directly provided from the corresponding payment server) via the server 200. Herein, the payment function execution result includes a product name for at least one product, a product unique code, a product related image, a payment amount (for example, including an amount of at least one product, a delivery fee, etc.), seller information, and the like.

Further, the terminal 100 displays the received payment function execution result.

The server 200 communicates with the terminal 100, one or more terminals 300, and the like.

Further, the server 200 receives the search word transmitted from the terminal 100, the identification information of the terminal 100, and the like.

Further, the server 200 checks (alternatively, searches) a product corresponding to the received search word among a plurality of products registered in the server 200 (alternatively, product information corresponding to the received search word among a plurality of product information associated with a plurality of products). Herein, the plurality of products (alternatively, the plurality of pieces of product information) may be a product (alternatively, product information) registered in the corresponding server 200 in a plurality of sale terminals (not illustrated) (alternatively, a plurality of sellers corresponding to the plurality of sale terminals) registered as sellers in the corresponding server 200. In this case, the product information includes category information of the product, a product name, a product unique code, a product related image, price information, delivery fee information (for example, including free delivery condition information, etc.), seller information, and the like. In addition, the seller information includes a seller name (e.g., including a name of the seller, a nickname, an ID, a company name, etc.), location information of the seller, contact information of the seller, a registration number of an online marketing business, and the like.

Further, the server 200 transmits a search result corresponding to the checked (alternatively, searched) search word to the corresponding terminal 100. Herein, the search result includes one or more pieces of product information associated with the product corresponding to the search word, and includes category information of the product, a product name, a product unique code, a product related image, grade information, review information (alternatively, comment information), recommendation information, price information, delivery fee information (for example, including free delivery condition information, etc.), seller information, and the like, according to the search result. In addition, the seller information includes a seller name (e.g., including a name of the seller, a nickname, an ID, a company name, etc.), location information of the seller, contact information of the seller, a registration number of an online marketing business, and the like.

Further, when there is no product corresponding to the search word among the plurality of products registered in the server 200, the server 200 may transmit information indicating that there is no product corresponding to the search word to the corresponding terminal 100.

In addition, the server 200 performs a grouping function for at least one product information included (alternatively, temporarily stored) in a shopping cart (alternatively, a shopping cart item) associated with the corresponding terminal 100 by interlocking with the terminal 100.

In addition, the server 200 performs a naming function (alternatively, a group name setting function) for a group (alternatively, a shopping cart group) including at least one product information grouped by interlocking with the terminal 100.

In addition, the server 200 stores information on a group including at least one grouped product information (for example, including a group name, at least one product information included in the corresponding group, and the like).

At this time, when the terminal 100 is logged in to the dedicated app (alternatively, the shopping mall site), the server 200 stores (alternatively, manages) information on the corresponding group in an account associated with the user of the corresponding terminal 100 by interlocking.

Further, when the terminal 100 is not logged in to the dedicated app (alternatively, the shopping mall site), the server 200 temporarily stores the information on the corresponding group until the terminal 100 ends the access to the corresponding app (alternatively, the shopping mall site), or temporarily stores the identification information of the corresponding terminal 100 and the information on the corresponding group for a predetermined period (for example, 7 days).

As such, when the terminal 100 accesses the server 200 through the dedicated app or the shopping mall site later while the identification information of the corresponding terminal 100 and the information on the corresponding group are temporarily stored in the server 200, the server 200 checks the identification information of the terminal 100 which is currently accessed, and may also provide, to the corresponding terminal 100, information on a temporarily stored group corresponding to the identification information of the corresponding terminal 100 among the temporarily stored information based on the checked identification information of the terminal 100 which is currently accessed.

Further, the server 200 may also receive one or more pieces of sharing information (e.g., a phone number, an email address, a social network account information, etc.) transmitted from the terminal 100, sharing request information about at least one product included in a shopping cart item associated with the corresponding terminal 100, the identification information of the terminal 100, and the like.

Also, the server 200 generates a web page capable of checking at least one product information included (alternatively, stored) in the shopping cart item associated with the corresponding terminal 100 based on the received sharing request information.

That is, the server 200 generates a web page including at least one product information included in the shopping cart item associated with the corresponding terminal 100.

Further, the server 200 transmits address information (alternatively, URL address/web page address information) on the generated web page to one or more other terminals 300 corresponding to the received one or more pieces of sharing information, respectively.

As such, the server 200 may transmit (alternatively, provide) to one or more other terminals 300 address information about the web page in a text message form, an email form, asocial network service form, and the like.

In this case, when the terminal 100 is not logged in to the dedicated app (alternatively, the shopping mall site), the server 200 may also provide (alternatively, transmit) the address information about the corresponding web page even to the terminal 100 so as to check the information when the terminal 100 accesses the corresponding web page later.

Herein, when the shopping cart item including at least one product information to be shared is named (alternatively, the group name is set), the server 200 may also provide to other terminals 300 whether the address on the corresponding web page is used for sharing any purpose of shopping cart by transmitting the group name corresponding to the corresponding shopping cart item together, when transmitting the address information about the web page.

Further, when there is another terminal (not illustrated) in which a specific product among at least one product information included in the web page is added in the shopping cart by currently accessing the server 200, the server 200 may also provide the address for the corresponding web page to another terminal.

For example, when there is another terminal in which BBB beef and CCC lettuce, which are specific products in product information such as BBB beef, CCC lettuce, DDD ssamjang, EEE garlic, and FFF green pepper contained in the web page, are added in the shopping cart, the server 200 provides an address for the web page including the product information such as BBB beef, CCC lettuce, DDD ssamjang, EEE garlic, and FFF green pepper to the corresponding another terminal, or a user of another terminal provides information about a product to be additionally purchased in addition to the BBB beef and the CCC lettuce, thereby providing convenience for the shopping.

Further, the server 200 provides at least one product information included in the corresponding web page to specific another terminal 300 with respect to specific other terminal 300 which selects address information about the web page transmitted to each of one or more other terminals 300.

Further, when a predetermined shopping cart item (alternatively, copy/paste menu/item/button) displayed on one side of the web page screen displayed on one or more other terminals 300 (alternatively, the specific other terminal 300) is selected, the server 200 allows at least one product information included in the web page set in the terminal 100 to be stored in the shopping cart item associated with the corresponding other terminal 300 by interlocking with one or more other terminals 300 (alternatively, the specific other terminal 300).

Further, by interlocking with the terminal 100 (alternatively, other terminals 300), the server 200 and the payment server, after performing the payment function for at least one product, the server 200 receives a payment function execution result transmitted from the payment server and transmits the received payment function execution result to the corresponding terminal 100 (alternatively, other terminals 300).

Further, the server 200 may be embodied in a form of a web server, a database server, a proxy server, and the like.

Further, in the server 200, a network load distribution mechanism and at least one of a variety of software which allows the server 200 to operate on the Internet or other networks may be installed, and as a result, the server 200 may be embodied by a computerized system. Further, the network maybe an http network and may be a private line, the Intranet, or any other networks. Furthermore, the server 300 and the terminal 100/other terminals 300 may be connected to each other by a security network so as to prevent the data from being attacked by any hacker or other third parties. Further, the server 200 may include a plurality of database servers, and the database servers may be embodied to be separately connected with the server 200 through any type of network connection including a distributed database sever architecture.

Each of one or more other terminals 300 communicates with the terminal 100, the server 200, and the like.

In addition, one or more other terminals 300 receive address information about the web page, a group name, and the like which are transmitted from the server 200, respectively.

In addition, one or more other terminals 300 display the address information about the web page, the group name, and the like which are received, respectively.

Also, when address information about a web page displayed on a specific other terminal 300 is selected according to a user selection (alternatively, a user touch) of the specific other terminal 300 among the one or more other terminals 300, the specific other terminal 300 accesses a web page provided by the corresponding server 200 by interlocking with the server 200.

Further, the specific other terminal 300 checks (alternatively, inquires/displays) at least one product information provided from the corresponding web page.

Further, when a predetermined shopping cart item (alternatively, copy/paste menu/item/button) displayed on one side of the web page screen displayed on one or more other terminals 300 (alternatively, the specific other terminal 300) is selected, the one or more other terminals 300 (alternatively, the specific other terminal 300 automatically store (alternatively, temporarily stores) at least one product information included in the web page in the shopping cart item associated with the corresponding one or more terminal 300 (alternatively, the specific other terminal 300) through coping and pasting by interlocking with the server 200.

In this case, while the shopping cart item including at least one product information to be shared in the corresponding web page is named (alternatively, the group name is set) by the terminal 100, when at least one product information included in the web page is copied and pasted to the shopping cart item associated with the corresponding one or more other terminals 300 (alternatively, the specific other terminal 300), the corresponding one or more other terminals 300 (alternatively, the specific other terminal 300) may store a group name included in the web page and at least one product information included in the group in the shopping cart item associated with the corresponding one or more other terminals 300 (alternatively, the specific other terminal 300) as it is by interlocking with the server 200.

Further, when the payment function for at least one product information included in the shopping cart of other terminals 300 is selected, other terminals 300 perform a payment function for at least one product associated with at least one selected product information by interlocking with the server 200 and a payment server (not illustrated). In this case, other terminals 300 may also perform a payment function for at least one product finally determined by interlocking with the terminal 100 and/or one or more other terminals 300 sharing the product information.

In addition, other terminals 300 receive a payment function execution result provided from the payment server (alternatively, directly provided from the corresponding payment server) via the server 200. Herein, the payment function execution result includes a product name, a product unique code, a product related image, a payment amount (for example, including an amount of at least one product, a delivery fee, etc.), seller information, and the like for at least one product.

Further, other terminals 300 display the received payment function execution result.

In the embodiment of the present invention, the terminal 100 is described for the sharing request of the product information and other terminals 300 are described to store the product information shared by the terminal 100 in the its shopping cart item according to the sharing request, but the present invention is not limited thereto. In addition, the terminal 100 and/or other terminals 300 may involve in the sharing request of the product information or store the shared product information in its shopping cart, respectively.

Further, in the embodiment of the present invention, through the dedicated apps installed in the terminal 100 and other terminals 300, the configuration that performs various functions described above by communicating with the server 200 is described, but the present invention is not limited thereto. In addition, the terminal 100 and other terminals 300 may also be constituted to access a web site (for example, a shopping mall site) provided by the server 200 and perform the various functions described above through the corresponding accessed web site.

Further, the terminal 100 and/or other terminals 300 may further include an interface unit (not illustrated) serving as an interface with all external devices connected to the corresponding terminal 100 and/or other terminals 300. For example, the interface unit may be constituted by a wired/wireless headset port, an external charger port, a wired/wireless data port, a memory card port, a port connecting devices with identification modules, an audio input/output (I/O) port, a video input/output (I/O) port, an earphone port, and the like. Herein, the identification module is a chip for storing various types of information for authenticating authority of use of the terminal 100 and/or other terminals 300 and may include a user identity module (UIM), a subscriber identity module (SIM), a universal subscriber identity module (USIM), and the like. Further, the device provided with the identification module may be manufactured in a smart card form. Accordingly, the identification module may be connected with the terminal 100 and/or other terminals 300 through the port. Such an interface unit receives data or power from an external device to transmit the received data or power to each component in the terminal 100 and/or other terminals 300 or transmit the data in the terminal 100 and/or other terminals 300 to the external device.

Further, the interface unit may be a passage through which the power is supplied from a cradle to the corresponding terminal 100 and/or other terminals 300 when the terminal 100 and/or other terminals 300 are connected with an external cradle, or a passage through which various command signals input from the cradle by the user are transmitted to the corresponding terminal 100 and/or other terminals 300 by the user. Various command signals input from the cradle or the corresponding power may also operate as a signal for recognizing that the terminal 100 and/or other terminals 300 are accurately installed on the cradle.

Further, the terminal 100 and/or other terminals 300 may further include an input unit (not illustrated) for receiving a signal according to a button operation or any function selection of the user or receiving a command or a control signal generated by an operation such as touching/scrolling the displayed screen.

The input unit is a means for receiving at least one of a user's command, selection, data, and information and may include a plurality of input keys and function keys for receiving figure or text information and setting various functions.

Further, the input unit may use various devices, such as a key pad, a dome switch, a touch pad (constant pressure type/capacitive type), a touch screen, a jog wheel, a jog switch, a jog shuttle, a mouse, a stylus pen, and a touch pen. Particularly, when the display unit is formed in the touch screen type, some or all of the input functions may be performed by the display unit.

Further, each component (alternatively, each module) of the terminal 100 and/or other terminals 300 may be software stored on a memory (alternatively, a storage unit) of the terminal 100 and/or other terminals 300. The memory may be an internal memory of the terminal 100 and/or other terminals 300 and may an external memory or other types of storage devices. Further, the memory may be a nonvolatile memory. The software stored on the memory may include a command set to allow the terminal 100 and/or other terminals 300 to perform a specific operation while executing.

Further, processors mounted on the terminal 100 and/or other terminals 300 and the server 300 according to the present invention may process program commands for executing the method according to the present invention. In an embodiment, the processor may be a single-threaded processor, and in another embodiment, the processor may be a multi-threaded processor. Further, the processor may process commands stored in the memory or the storage device.

As such, when the sharing function for at least one product information stored in the shopping cart is selected by the user of the terminal in the shopping mall site provided from the server, it is possible to generate a web page capable of checking information on at least one product information, provide a URL address associated with the generated web page to one or more other terminals associated with the terminal in a text message form, a messenger service form, a social network service form, and the like, check at least one product information to be shared by the user of the terminal by accessing a web page corresponding to the URL address including at least one product information by means of one or more other terminals, and perform a copy/paste function of at least one checked product information to the user's shopping cart.

In addition, as such, it is possible to group a plurality of products included in the shopping cart for each purpose according to a purpose, and provide a naming function for the group.

Hereinafter, a method of providing product information using a copy/paste function of an electronic commerce shopping cart according to the present invention will be described with reference to FIGS. 1 to 8.

Figure 2:
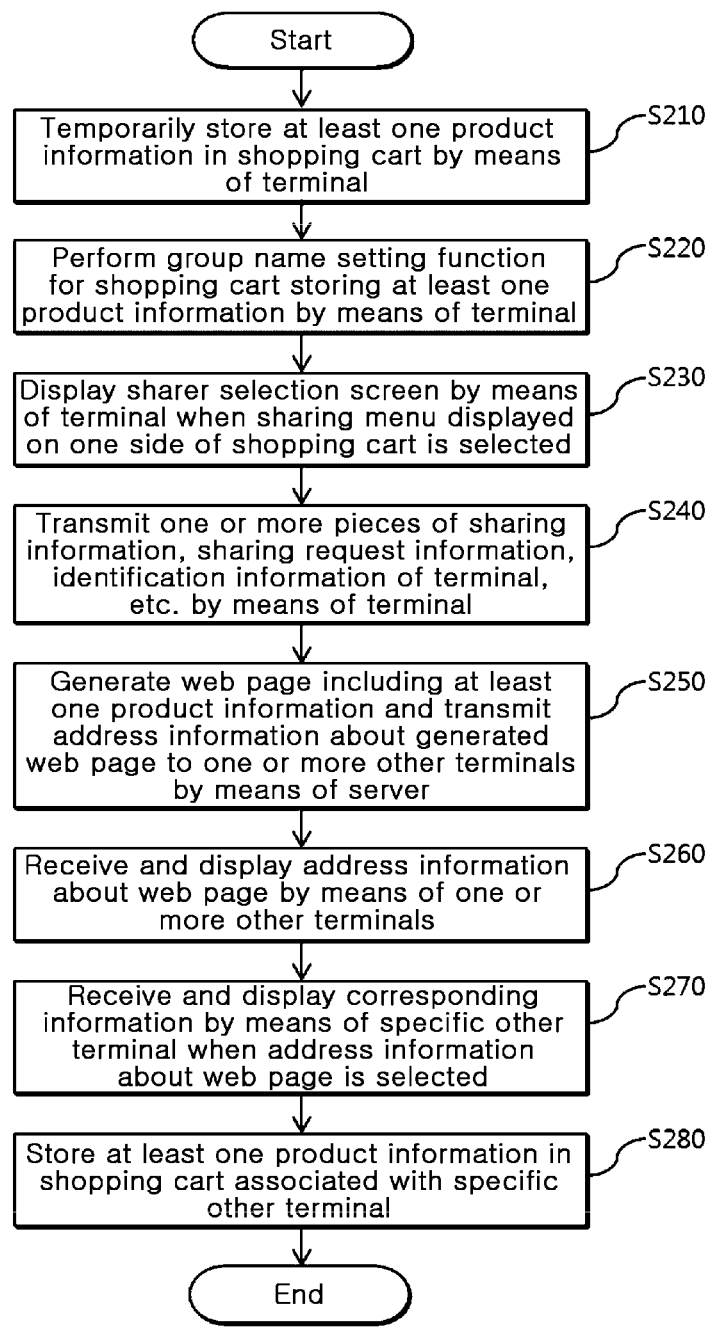
FIG. 2 is a flowchart illustrating a method of providing product information using a copy/paste function of an electronic commerce shopping cart according to an embodiment of the present invention.

FIG. 2 is a flowchart illustrating a method of providing product information using a copy/paste function of an electronic commerce shopping cart according to an embodiment of the present invention.

First, the terminal 100 executes a dedicated app (alternatively, an application) installed in the terminal 100 according to a user's selection (alternatively, a user touch/input) to display an app execution result screen. Herein, the app execution result screen may be a screen corresponding to a web site (for example, a shopping mall site) provided by the server 200 associated with the corresponding dedicated app.

In addition, the terminal 100 temporarily stores (alternatively, adds) at least one product information (alternatively, at least one product corresponding to at least one product information) selected from one or more product information provided from the server 200 in the shopping cart item (alternatively, the shopping cart) provided from the corresponding dedicated app (alternatively, the corresponding shopping mall site) in response to the search word associated with the product to be purchased (alternatively, searched/inquired) by the user (alternatively, the purchaser) associated with the terminal 100 according to one or more product information provided from the app execution result screen and/or the user input. In this case, the terminal 100 may be logged in or not logged in to the dedicated app (alternatively, the corresponding shopping mall site).

In addition, when a shopping cart menu displayed on one side of the current screen of the terminal 100 is selected after a process of inquiring the product and storing the product in the shopping cart item according to the user's selection ends, the terminal 100 displays a shopping cart screen (alternatively, a shopping cart screen corresponding to the shopping cart menu) including at least one product information selected above.

Figure 3:
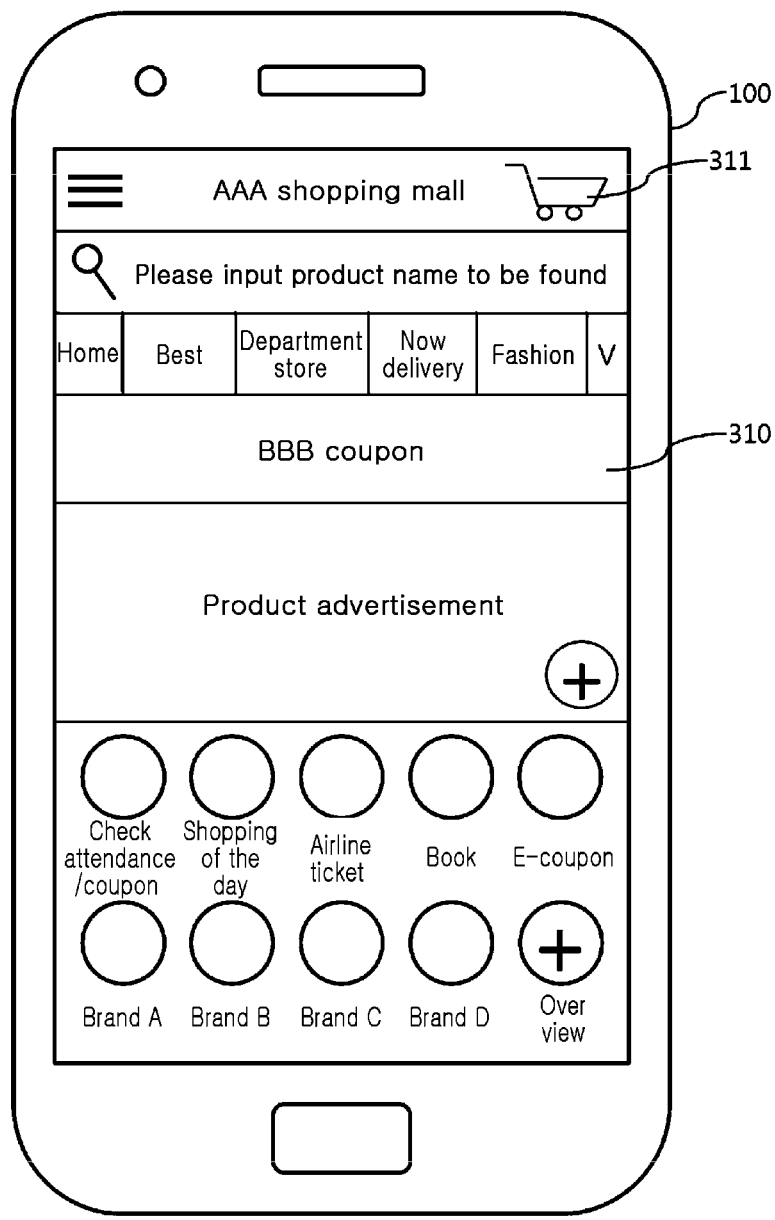
FIGS. 3 to 6 are diagrams illustrating a screen of a terminal according to the embodiment of the present invention.
Figure 4:
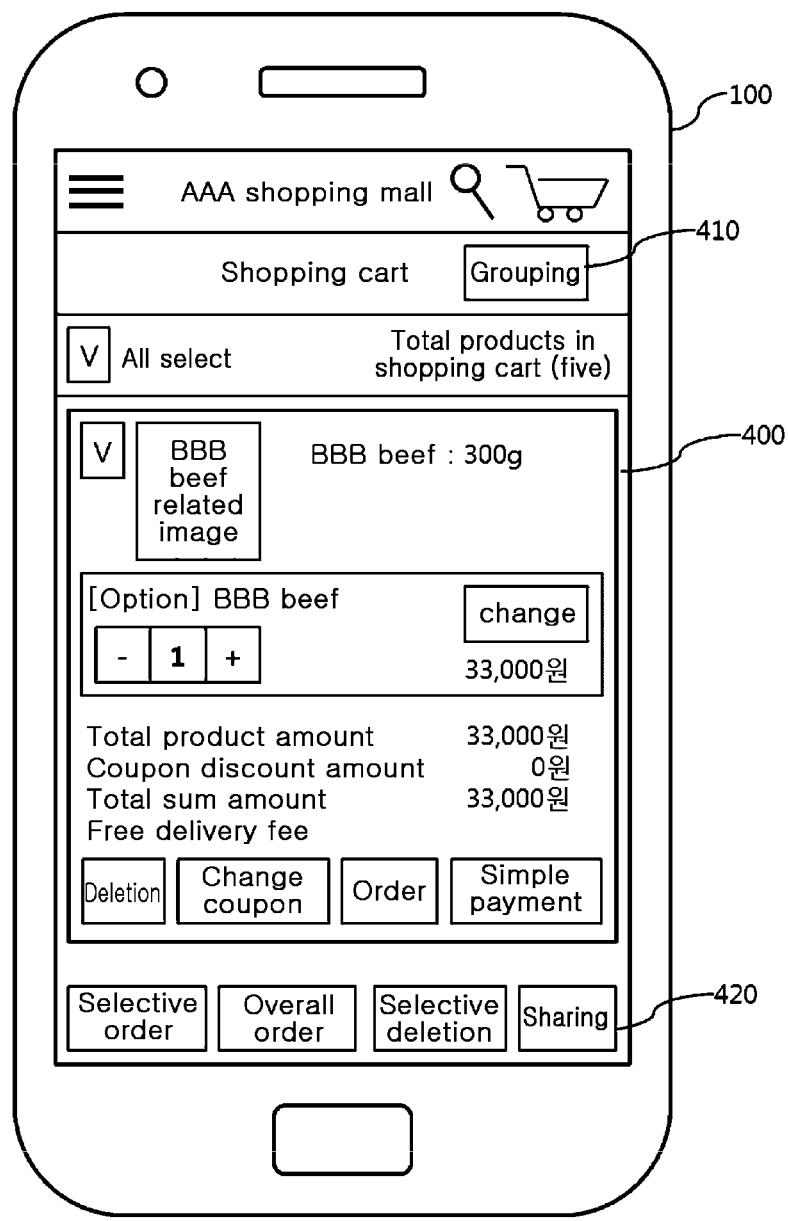

As an example, as illustrated in FIG. 3, when an AAA shopping mall app installed in the terminal 100 is executed, the terminal 100 displays an AAA shopping mall app execution result screen 310. In addition, the terminal 100 adds BBB beef, CCC lettuce, DDD ssamjang, EEE garlic, FFF green pepper, and the like inquired by the user of the terminal 100 by interlocking with the server 200 in a shopping cart (alternatively, a shopping cart Item) in a predetermined AAA shopping mall app. When a shopping cart menu 311 included in the AAA shopping mall app execution result screen 310 illustrated in FIG. 3 is selected, as illustrated in FIG. 4, the terminal 100 displays a shopping cart screen 400 including product information about BBB beef, CCC lettuce, DDD ssamjang, EEE garlic, FFF green pepper, and the like inquired by the user of the terminal 100 stored in the shopping cart (S210).

Thereafter, when a grouping menu (alternatively, a grouping item/button) displayed on one side of the shopping cart screen of the terminal 100 is selected, the terminal 100 groups at least one product information included in the current shopping cart by interlocking with the server 200 and performs a naming function (alternatively, a group name setting function) for a group (alternatively, a shopping cart group) including at least one product information grouped according to the user input.

In addition, the server 200 stores information about a group including at least one grouped product information (for example, a group name, at least one product information included in the corresponding group, etc.).

At this time, when the terminal 100 is logged in to the dedicated app (alternatively, the shopping mall site), the server 200 stores (alternatively, manages) information on the corresponding group in an account associated with the user of the corresponding terminal 100 by interlocking.

Further, when the terminal 100 is not logged in to the dedicated app (alternatively, the shopping mall site), the server 200 temporarily stores the information on the corresponding group until the terminal 100 ends the access to the corresponding app (alternatively, the shopping mall site), or temporarily stores the identification information of the corresponding terminal 100 and the information on the corresponding group for a predetermined period (for example, 7 days).

Figure 5:
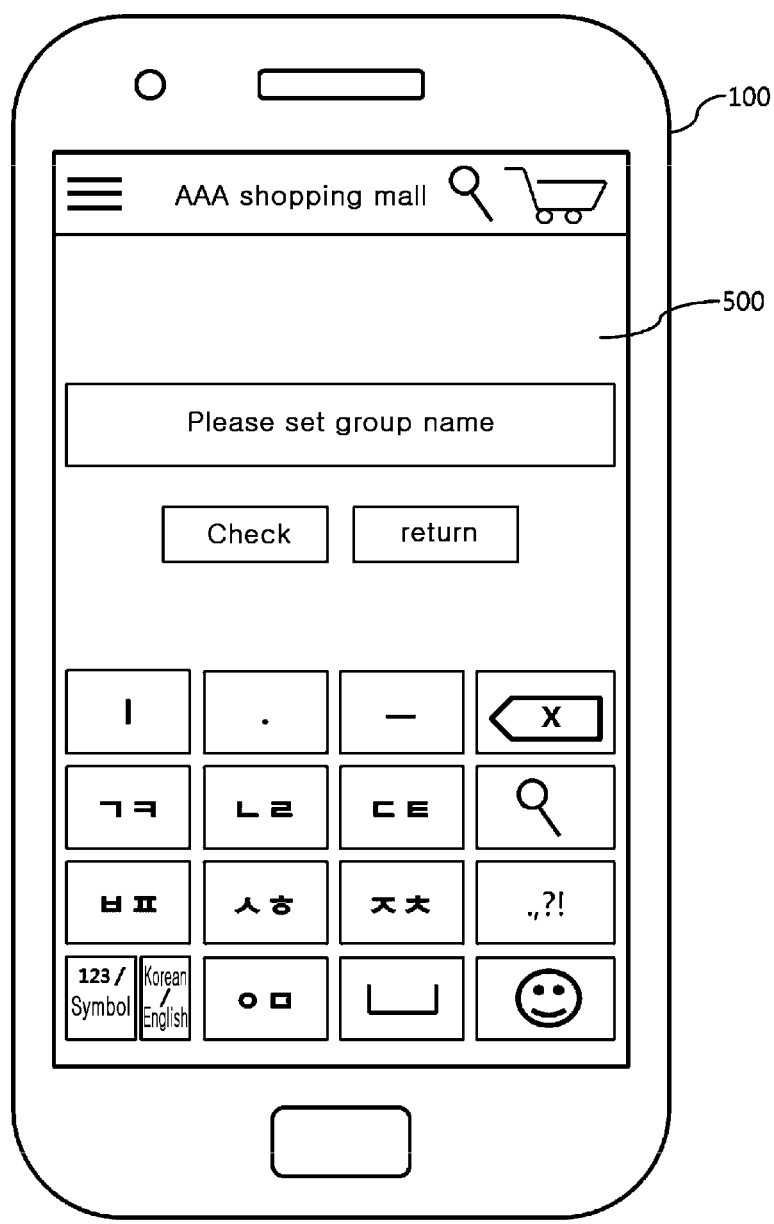

As an example, when a predetermined grouping menu 410 included in the shopping cart screen 400 illustrated in FIG. 4 is selected, as illustrated in FIG. 5, the terminal 100 groups product information about BBB beef, CCC lettuce, DDD ssamjang, EEE garlic, FFF green pepper, and the like included in the current shopping cart item and displays a group name setting screen 500 for setting a group name of the corresponding grouped group.

Further, the terminal 100 sets a group name (for example, a shopping list for this weekend) including the product information about BBB beef, CCC lettuce, DDD ssamjang, EEE garlic, FFF green pepper, and the like according to a user input (S220).

Further, when a sharing menu (or a sharing item/button) displayed on the other side of the shopping cart screen of the terminal 100 is selected, the terminal 100 displays a sharer selection screen for selecting one or more other terminals 300 for sharing at least one product information temporarily stored in the current shopping cart item. Herein, the sharer selection screen includes one or more telephone numbers stored in the terminal 100, one or more email addresses stored in the terminal 100, one or more pieces of other user information registered as friends (alternatively, followers in Facebook and the like) in a social network account associated with the terminal 100, items for receiving telephone numbers and/or addresses according to a user input, and the like.

Figure 6:
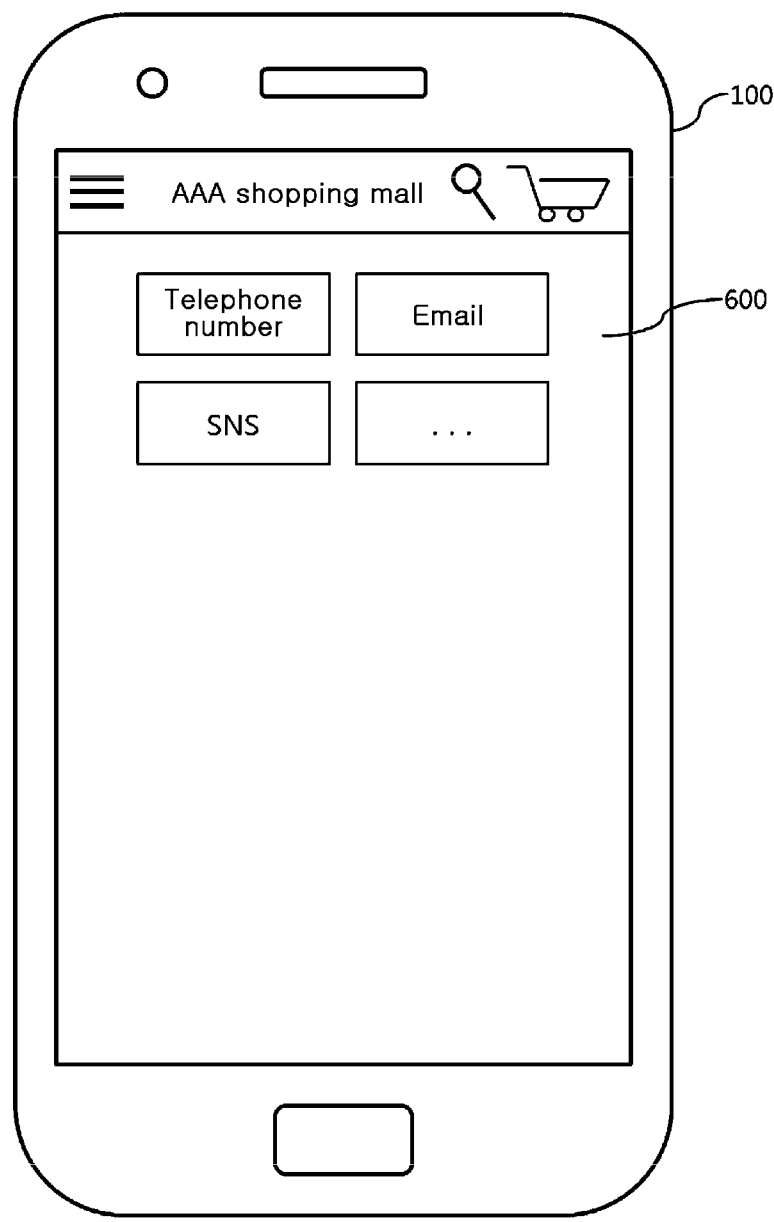

As an example, when a predetermined sharing menu 420 included in the shopping cart screen 400 illustrated in FIG. 4 is selected, as illustrated in FIG. 6, the terminal 100 displays a sharer selection screen 600 for selecting one or more other terminals 300 for sharing product information about BBB beef, CCC lettuce, DDD ssamjang, EEE garlic, FFF green pepper, and the like included in the current shopping cart item (S230).

Thereafter, the terminal 100 transmits to terminal 200 one or more pieces of sharing information (for example, including a telephone number, an email address, social network account information, etc.) selected according to a user selection (alternatively, a user input) from the sharer selection screen displayed on the terminal 100, sharing request information about at least one product included in the shopping cart item associated with the corresponding terminal 100, identification information of the terminal 100, and the like. Herein, the identification information of the terminal 100 includes a MDN, a mobile IP, a mobile MAC, subscriber identity module (Sim) card unique information, a serial number, and the like.

As an example, when a telephone book menu is selected from the sharer selection screen 600 illustrated in FIG. 6 according to a user selection, a telephone number (for example, 010-1234-5678) of a father, who is one of the family, is selected from a telephone book screen (for example, including information 20 (e.g., a name/nickname, a contact address, an abbreviated number, an email address, etc.) prestored in the terminal 100 in response to the selected telephone book menu, a social network account information menu is selected from the sharer selection screen 600 illustrated in FIG. 6 according to a user 25 selection, and a mother's account, who is one of the family, is selected from one or more pieces of account information interlocking with the terminal 100 in response to the selected social network account information menu, the terminal 100 transmits to the server 300 first sharing information (for example, including information about a father's telephone number and a mother's social network account), first sharing request information, identification information of the terminal 100, and the like (S240).

Thereafter, the server 200 receives one or more pieces of sharing information (e.g., a phone number, an email address, a social network account information, etc.) transmitted from the terminal 100, sharing request information about at least one product included in a shopping cart item associated with the corresponding terminal 100, the identification information of the terminal 100, and the like.

Also, the server 200 generates a web page capable of checking at least one product information included in the shopping cart item associated with the corresponding terminal 100 based on the received sharing request information.

That is, the server 200 generates a web page including at least one product information included in the shopping cart item associated with the corresponding terminal 100.

Further, the server 200 transmits address information (alternatively, URL address/web page address information) on the generated web page to one or more other terminals 300 corresponding to the received one or more pieces of sharing information, respectively.

In this case, when the terminal 100 is not logged in to the dedicated app (alternatively, the shopping mall site), the server 200 may also provide (alternatively, transmit) the address information about the corresponding web page even to the terminal 100 so as to check the information when the terminal 100 accesses the corresponding web page later.

Herein, when the shopping cart item including at least one product information to be shared is named (alternatively, the group name is set), the server 200 may also provide to other terminals 300 whether the address on the corresponding web page is used for sharing any purpose of shopping cart by transmitting the group name corresponding to the corresponding shopping cart item together, when transmitting the address information about the web page.

As an example, the server 200 receives the first sharing information (for example, including information about a father's telephone number and a mother's social network account), the first sharing request information, the identification information of the terminal 100, and the like which are received from the terminal 100.

In addition, the server 200 generates a first web page address (for example, http://www.test.co.kr/shoppingcart0001.html) including product information about BBB beef, CCC lettuce, DDD ssamjang, EEE garlic, FFF green pepper, and the like included in the shopping cart item associated with the corresponding terminal 100 based on the received first sharing request information.

In addition, the server 200 transmits the generated first web page address information (for example, http://www.test.co.kr/shoppingcart0001.html), a group name (for example, a shopping list for this weekend), and the like to the first other terminal 300 corresponding to the father's telephone (e.g., 010-1234-5678) and the second other terminal 300 corresponding to the information about the mother's social network account, respectively (S250).

Thereafter, one or more other terminals 300 receive address information, a group name, and the like for the web page transmitted from the server 200, respectively.

In addition, one or more other terminals 300 display the address information, group name, and the like for the web page which are received, respectively.

Figure 7:
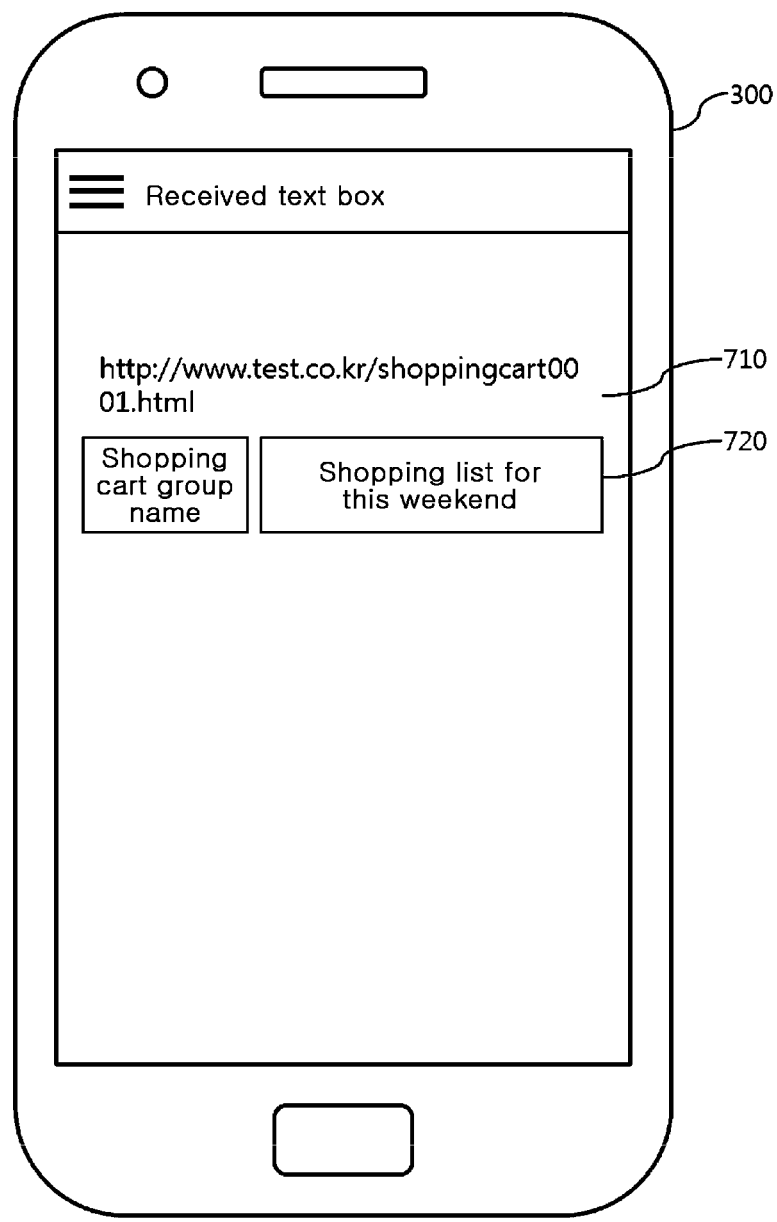
FIGS. 7 and 8 are diagrams illustrating a screen of the terminal according to the embodiment of the present invention.

As an example, the first other terminal corresponding to the father's telephone (e.g., 010-1234-5678) receives the first web page address information (for example, http://www.test.co.kr/shoppingcart0001.html), a group name (for example, a shopping list for this weekend), and the like which are transmitted from the server 200, and displays the received first web page address information 710 (for example, http://www.test.co.kr/shoppingcart0001.html), the group name 720 (for example, a shopping list for this weekend), and the like as illustrated in FIG. 7.

In addition, the second other terminal corresponding to the information about the mother's social network account receives the first web page address information (for example, http://www.test.co.kr/shoppingcart0001.html), a group name (for example, a shopping list for this weekend), and the like which are transmitted from the server 200, and displays the received first web page address information (for example, http://www.test.co.kr/shoppingcart0001.html), the group name (for example, a shopping list for this weekend), and the like through the social network service app installed in the second other terminal (S260).

Thereafter, when address information about a web page displayed on a specific other terminal 300 is selected according to a user selection (alternatively, a user touch) of the specific other terminal 300 among the one or more other terminals 300, the specific other terminal 300 accesses a web page provided by the corresponding server 200 by interlocking with the server 200.

Further, the specific other terminal 300 checks (alternatively, inquires/displays) at least one product information provided from the corresponding web page.

As an example, when the first web page address information is selected from the first web page address information 710 (for example, http://www.test.co.kr/shoppingcart0001.html), the group name 720 (for example, a shopping list for this weekend), and the like as illustrated in FIG. 7 by a user touch of the first other terminal, the first other terminal accesses the first web page corresponding to the first web page address information by interlocking with the server 200.

Figure 8:
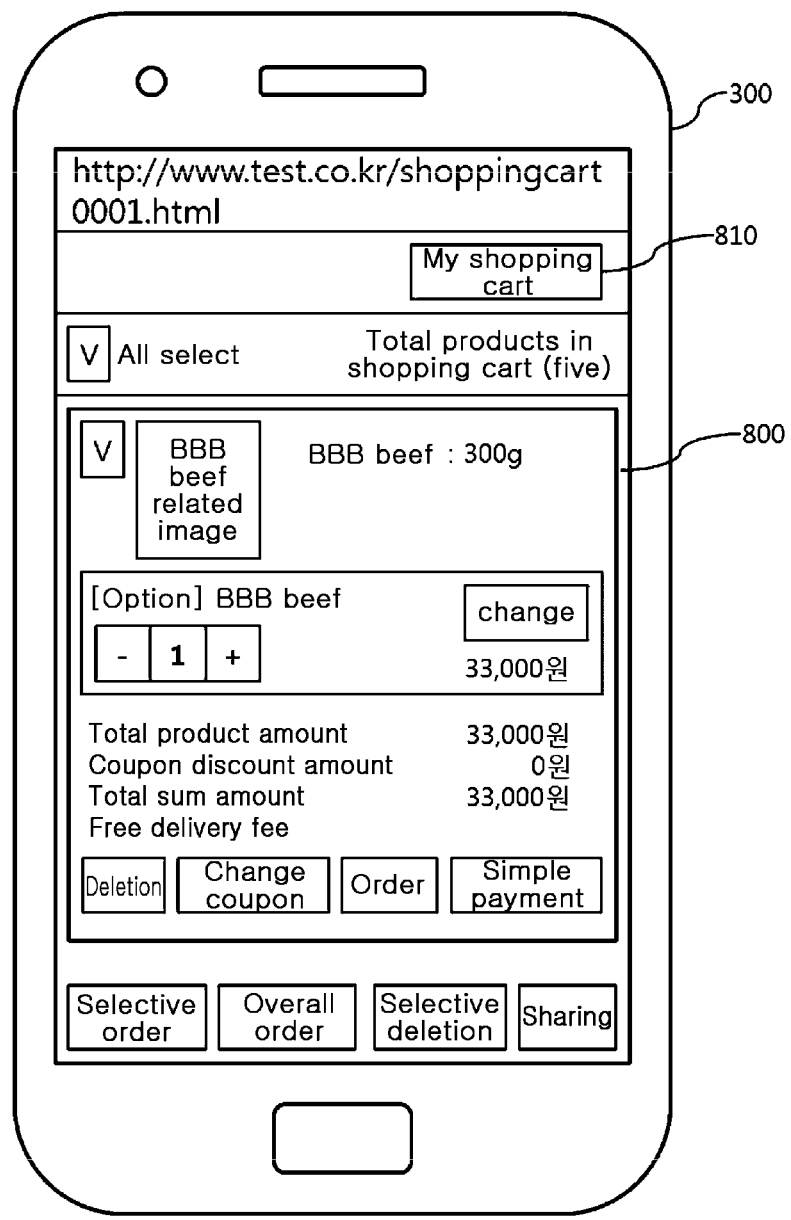

Further, as illustrated in FIG. 8, a first other terminal displays production information 800 of BBB beef, CCC lettuce, DDD ssamjang, EEE garlic, FFF green pepper, and the like provided in a corresponding first web page (S270).

Thereafter, when a predetermined shopping cart item (alternatively, copy/paste menu/item/button) displayed on one side of the web page screen displayed on one or more other terminals 300 (alternatively, the specific other terminal 300) is selected, the one or more other terminals 300 (alternatively, the specific other terminal 300 automatically store (alternatively, temporarily store) at least one product information included in the web page in the shopping cart item associated with the corresponding one or more other terminal 300 (alternatively, the specific other terminal 300) through coping and pasting by interlocking with the server 200.

In this case, while the shopping cart item including at least one product information to be shared in the corresponding web page is named (alternatively, the group name is set) by the terminal 100, when at least one product information included in the web page is copied and pasted to the shopping cart item associated with the corresponding one or more other terminals 300 (alternatively, the specific other terminal 300), the corresponding one or more other terminals 300 (alternatively, the specific other terminal 300) may store a group name included in the web page and at least one product information included in the group in the shopping cart item associated with the corresponding one or more other terminals 300 (alternatively, the specific other terminal 300) as it is by interlocking with the server 200.

That is, while the shopping cart item including at least one product information to be shared in the corresponding web page is named (alternatively, the group name is set) by the terminal 100, when at least one product information included in the web page is copied and pasted to the shopping cart item associated with the corresponding one or more other terminals 300 (alternatively, the specific other terminal 300), the corresponding one or more other terminals 300 (alternatively, the specific other terminal 300) may automatically store (alternatively, copy and paste) a shopping cart set with the group name in the shopping cart associated with the specific other terminal 300 as it is by interlocking with the server 200.

As an example, when a shopping cart item 810 displayed on one side of the product information 800 of BBB beef, CCC lettuce, DDD ssamjang, EEE garlic, FFF green pepper, and the like provided from the corresponding first web page illustrated in FIG. 8 is selected, the first other terminal temporarily stores the product information 800 of BBB beef, CCC lettuce, DDD ssamjang, EEE garlic, FFF green pepper, and the like in the shopping cart item associated with the first other terminal by interlocking with the server 200.

In this case, the first terminal groups the shopping cart item storing the product information 800 of BBB beef, CCC lettuce, DDD ssamjang, EEE garlic, FFF green pepper, and the like in the shopping cart item associated with the first other terminal by interlocking with the server 200 and sets (alternatively, keeps) the corresponding group name as a group name (for example, a shopping list for this weekend) set in the terminal 100 above (S280).

The system of providing the product information using the copy/paste function of the electronic commerce shopping cart according to the embodiment of the present invention can be prepared by computer programs, and codes and code segments configuring the computer programs may be easily deduced by computer programmers in the art. Further, the corresponding computer program is stored in non-transitory computer readable storage media, and read and executed by a computer or the plurality of terminals, the server, and the like according to the embodiment of the present invention to embody the system of providing the product information using the copy/paste function of the electronic commerce shopping cart.

The non-transitory computer readable storage media include magnetic recoding media and optical recording media. Computer programs that embody the system of providing the product information using the copy/paste function of the electronic commerce shopping cart according to the embodiment of the present invention may be stored and installed in embedded memories of the plurality of terminals, the server, and the like. Alternatively, external memories such as smart cards storing and installing the computer programs that embody the system of providing the product information using the copy/paste function of the electronic commerce shopping cart according to the embodiment of the present invention may also be installed in the plurality of terminals, the server, and the like through the interface.

According to embodiment of the present invention, as described above, when a sharing function for at least one product information stored in the shopping cart is selected by a user of a terminal in a shopping site provided from a server, it is possible to be utilized as an effective intercommunication means by mutual exchange of shopping lists with acquaintances or friends rather than alone shopping, enhance the convenience in use, and increase the probability of purchasing products, by generating a web page capable of checking information on at least one product information, providing a URL address associated with the generated web page to one or more other terminals associated with the terminal in a text message form, a messenger service form, a social network service form, and the like, checking at least one product information to be shared by the user of the terminal by accessing a web page corresponding to the URL address including at least one product information by means of one or more other terminals, and performing a copy/paste function of at least one checked product information to the user's shopping cart.

Further, it is possible to variously and conveniently manage products before purchasing, by grouping a plurality of products in the shopping cart for each purpose according to a purpose and providing a naming function for each group.

Hereinabove, although the present invention is described by specific matters such as concrete components, and the like, embodiments, and drawings, they are provided only for assisting in the entire understanding of the present invention. Therefore, the present invention is not limited to the embodiments. Therefore, the embodiments disclosed in the present disclosure are used to not limit but describe the technical spirit of the present disclosure and the scope of the technical spirit of the present disclosure is not limited by the embodiments. The scope of the present invention should be interpreted by the appended claims and it should be analyzed that all technical spirit in the equivalent range thereto is intended to be embraced by the scope of the present invention.

INDUSTRIAL AVAILABILITY

When a sharing function for at least one product information stored in the shopping cart is selected by the user of the terminal in the shopping mall site provided from the server, the present invention may generate a web page capable of checking information on at least one product information, provide a URL address associated with the generated web page to one or more other terminals associated with the terminal in a text message form, a messenger service form, a social network service form, and the like, check at least one product information to be shared by the user of the terminal by accessing a web page corresponding to the URL address including at least one product information by means of one or more other terminals, and perform a copy/paste function of at least one checked product information to the user's shopping cart. As a result, the present invention can be widely used in a shopping mall field, a customized service providing field, a shopping cart utilization field, a terminal field, a server field, and the like capable of being utilized as an effective intercommunication means by mutual exchange of the shopping list with acquaintances or friends other than solo shopping, increasing convenience in use, and enhancing probability of purchasing products.

DESCRIPTION OF REFERENCE NUMERALS AND SYMBOLS

10: System of providing product information
100: Terminal
200: Server
300: Other terminals

What is claimed is:

1. A method of providing product information using a copy/paste function of an electronic commerce shopping cart, the method comprising:
   receiving, by a server, sharing information from a terminal for sharing at least one product information stored in a shopping cart associated with the terminal;
   receiving, by the server, information about a group including at least one grouped product information, the information about the group generated at the terminal responsive to a user selecting a grouping menu displayed on a screen of the terminal;
   storing, information about the group in an account of the server associated with the user responsive to the terminal logging into a dedicated app or a shopping mall site provided by the server;
   generating, by the server, a web page including the information about the group associated with the terminal; and
   transmitting, by the server, address information about the generated web page to one or more other terminals according to the sharing information to cause the one or more other terminals to display the address information about the web page and the information about the group responsive to selection of the address information about the web page, and cause the one or more other terminals to automatically store the at least one grouped product information included in one or more shopping carts associated with the one or more other terminals responsive to users of the one or more other terminals selecting a predetermined copy/paste menu displayed on the one or more other terminals.

2. The method of claim 1, wherein the sharing information includes one or more of a telephone number, an email address, and social network account information.

3. The method of claim 1, further comprising receiving a group name for the group from the terminal responsive to the user providing the group name on the terminal, the the group name transmitted to the one or more other terminals for display on the one or more other terminals.

4. A non-transitory computer-readable storage medium storing a computer program comprising a set of instructions, the instructions when executed by a processor cause the processor to:

receive sharing information, from a terminal for sharing at least one product information stored in a shopping cart associated with the terminal;

receive information about a group including at least one grouped product information from the terminal, the information about the group generated at the terminal responsive to a user selecting a grouping menu displayed on a screen of the terminal;

store information about the group in an account of a server associated with the user responsive to the terminal logging into a dedicated app or a shopping mall site provided by the server;

generate a web page including the information about the group associated with the terminal; and transmit address information about the generated web page to one or more other terminals according to the sharing information to cause the one or more other terminals to display the address information about the web page and the information about the group responsive to selection of the address information about the web page, and cause the one or more other terminals to automatically store the at least one grouped product information included in one or more shopping carts associated with the one or more other terminals responsive to users of the one or more other terminals selecting a predetermined copy/paste menu displayed on the one or more other terminals.

5. A system of providing product information using a copy/paste function of an electronic commerce shopping cart, the system comprising:

a terminal configured to:
 display a grouping menu on a screen of the terminal,
 generate information about a group including at least one grouped product information responsive to a user selecting the grouping menu, and
 transmit sharing information, sharing request information for sharing at least one product information stored in a shopping cart associated with the terminal;

a server communicating with the terminal over a network, and configured to:
 receive the information about the group from the terminal,
 store the information about the group in an account of the server associated with the user responsive to the terminal logging into a dedicated app or a shopping mall site provided by the server,
 generate a web page including the information about the group associated with the terminal, and
 transmit address information about the generated web page to one or more other terminals according to the sharing information; and the one or more other terminals communicating with the server, and configured to:
 display the address information about the web page and the information about the group responsive to selection of the address information about the web page, and
 automatically store the at least one grouped product information included in one or more shopping carts associated with the one or more other terminals responsive to users of the one or more other terminals selecting a predetermined copy/paste menu displayed on the one or more other terminals.

6. The system of claim 5, wherein the terminal is further configured to receive a group name for the group responsive to the user providing the group name on the terminal, and transmit the group name to the server for the server to transmit the group name to one or more terminals for display on the one or more other terminals.

* * * * *